United States Patent
Ahnn

Patent Number: 5,946,037
Date of Patent: Aug. 31, 1999

[54] METHOD AND APPARATUS FOR REORDERING FRAMES IN MPEG CODER/DECODER

[75] Inventor: Jeong-Mo Ahnn, Seoul, Rep. of Korea

[73] Assignee: Daewoo Electronics Co., Ltd., Seoul, Rep. of Korea

[21] Appl. No.: 08/827,377

[22] Filed: Mar. 27, 1997

[30] Foreign Application Priority Data

Mar. 29, 1996 [KR] Rep. of Korea ..................... 96-9355

[51] Int. Cl.⁶ .................................................... H04N 7/26
[52] U.S. Cl. ............................... 348/384; 386/6; 386/68
[58] Field of Search ..................................... 348/390, 715, 348/384; 386/6, 7, 8, 33, 68, 81, 82, 111, 112

[56] References Cited

U.S. PATENT DOCUMENTS

| | | | |
|---|---|---|---|
| 5,247,355 | 9/1993 | Frederiksen | 358/105 |
| 5,621,464 | 4/1997 | Teo et al. | 348/390 |
| 5,818,533 | 10/1998 | Auld et al. | 348/412 |

FOREIGN PATENT DOCUMENTS

0 674 448A2  9/1995  European Pat. Off.

*Primary Examiner*—Tommy P. Chin
*Assistant Examiner*—John A. Voisinet
*Attorney, Agent, or Firm*—Pillsbury Madison & Sutro LLP

[57] ABSTRACT

A method and an apparatus for reordering frames in MPEG coder/decoder, in which input image frames of a displaying order are transformed to a transmitting order, and conversely, transmitted order to the displaying order, for coding and decoding by dividing image frame data into I-pictures, P-pictures, and B-pictures, comprise the steps of: determining whether current input image frames are B-pictures or not, and by-passing to an outer frame buffer if determined to be B-pictures; inputting line-scanned pixel data for B-pictures and storing the line-scanned data into a slice buffer in slice units; reading the stored data from the slice buffer and storing the read data into an inner frame buffer in macro block (MB) units; determining whether the processed slice is the last frame or not and repeating the previous steps, if not; and repeating the above entire steps for the next picture if the processed slice is the last frame.

5 Claims, 6 Drawing Sheets

FIG. 6A FRAME SYNC

FIG. 6E DATA

METHOD AND APPARATUS FOR REORDERING FRAMES IN MPEG CODER/DECODER

BACKGROUND OF THE INVENTION

1. Field of the Invention

The present invention relates to a method and an apparatus for reordering frames in Moving Picture Experts Group (MPEG) coder/decoder, and more particularly to reordering frames of successive digital image signals to code and decode image signals.

2. Description of the Prior Art

In general, motion estimation is a technique for compressing data in image processing methods that estimates a motion vector, in which the motions within the pixels of current frame and pixels of previous frame, in successive image signals, are transmitted as a motion vector and difference of data between macro blocks of the previous frame and the current frame.

In motion estimation, frames of input images are divided into Intra-mode pictures (I-pictures), Predictive-coded pictures (P-pictures), and Bidirectionally predicted-coded pictures (B-pictures). The P-pictures perform forward motion estimation and the B-pictures perform forward and backward motion estimation during the coding process.

In standard MPEG 2, image frames are divided into I-pictures, P-pictures, and B-pictures, and the Group of Picture (GOP) is formed from a series of image frames. The I-pictures are frames (or fields), which are coded within the GOP without the motion estimation. The P-pictures are frames that performs only the forward motion estimation by having I-pictures or other P-pictures as its reference. The B-pictures are frames that perform the forward and backward motion estimation by having I-pictures or P-pictures as its reference.

Figure 1A:
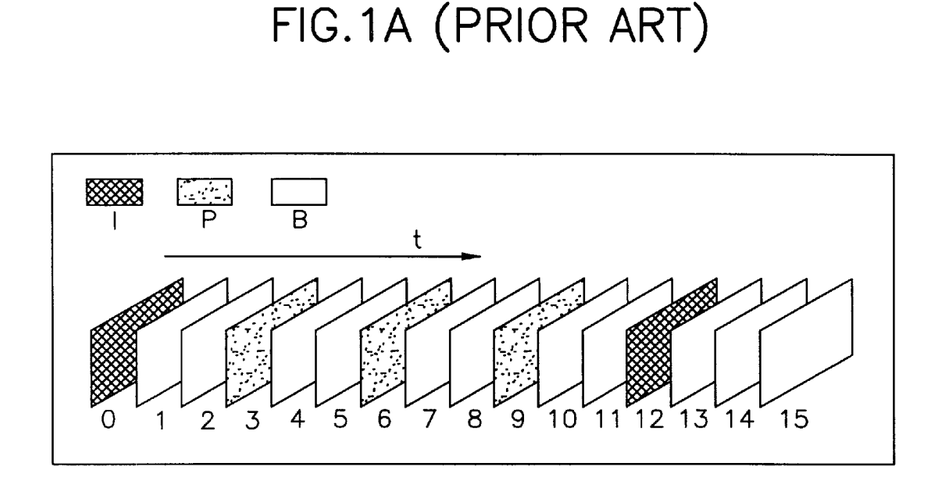
FIGS. 1A to 1B are views illustrating a succession of image frames in accordance with a preferred embodiment of the present invention.
Figure 1B:
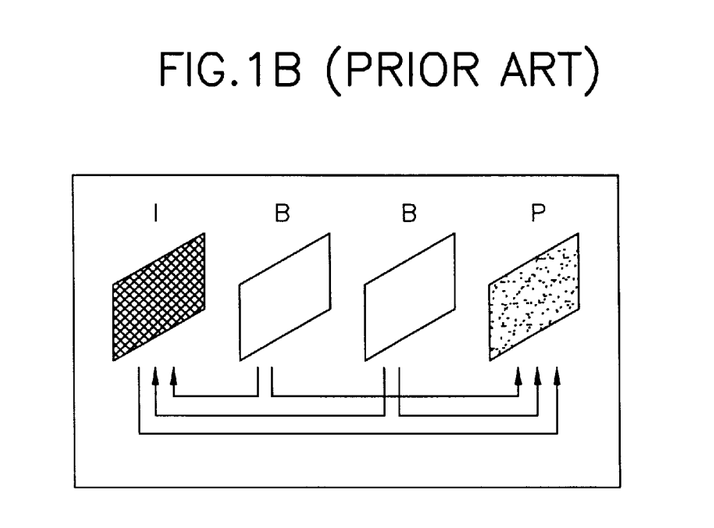

As illustrated in FIG. 1A, GOP is formed from the successive frames of I, B, B, P, B, B, P, B, B, P, B, B, I, . . . located on time-axis (t). As illustrated in FIG. 1B, the P-pictures for the I-pictures perform the forward motion estimation. The B-pictures for the I-pictures perform the forward motion estimation, and at the same time it also performs the backward motion estimation.

The order of input (displayed when decoded) frames called "a display order" and the coded transmitted order called "a transmission order" are unlike to each other, hence the order of frames needs to be reordered when coding and decoding.

In order to reorder image frames, a frame buffer is required to store the B-pictures. The capacity of frame buffer is not determined by the size of GOP but by a distance (M) between the I-pictures and the P-pictures. For example, when two B-pictures are inserted between the I-picture and the P-picture, a memory for 2 frames is required to store them. The B-pictures need to be stored since the I and P-pictures are directly transmitted to be processed in the motion estimation first, and the motion estimation of the B picture is performed subsequently.

The related art for reordering image data is disclosed in U.S. Pat. No. 5,247,355. However, in the prior art, as the apparatus for reordering order of image frames is constrained by the speed of DRAMs, a high capacity memory is required for double buffering due to the low speed of DRAMs conventionally utilized.

SUMMARY OF THE INVENTION

In view of the foregoing, it is an object of the invention to provide a method for reordering frames requiring a low capacity memory by using slice buffers and high speed DRAMs.

It is an another object of the present invention is to provide an apparatus for reordering frames requiring a low capacity memory by using slice buffers and high speed DRAMs.

To achieve the above objects, the present invention provides a method for reordering frames in MPEG coder/decoder, in which input image frames of displaying order are transformed to transmitting order, and conversely, received image frames of the transmitted order are transformed to displaying order, for coding and decoding by dividing the image frame data into I-pictures, P-pictures, and B-pictures. The method comprises steps of determining whether current input image frames are B-pictures or not, and by-passing to an outer frame buffer if determined not to be B-pictures; inputting line-scanned pixel data for B-pictures and storing the line-scanned data into a slice buffer in slice units; reading the stored data from the slice buffer and storing the data read to an inner frame buffer in macro block (MB) units; determining whether the processed slice is the last frame or not, and repeating the previous step, if not; and repeating the above entire steps for the next picture if the processed slice is the last frame.

In addition, to achieve the above objects, the present invention provides the apparatus for reordering frames in MPEG coder/decoder, in which the input image frames of a displaying order are transformed to transmitting order, and the received image frames of the transmitted order are transmitted to displaying order, for coding and decoding by dividing the image frame data into I-pictures, P-pictures, and B-pictures. The apparatus comprises a first slice buffer for storing luminance (Y) data of input image frames in slice units, transforming and outputting the data in macro block units; a second slice buffer for storing chrominance (C) data of input image frames in slice units, transforming and outputting the data in macro block units; a first frame buffer for storing the luminance (Y) output data from the first slice buffer in as much as 2 frames if the input image is determined to be B-picture; a second frame buffer for storing the chrominance (C) output data from the first slice buffer in as much as 2 frames if the input image is B-picture; and a reordering means for generating an address (A[0.. 12]) and a control signal (CONTROL_S) for reading and writing line-scanned data into and from the first and second slice buffer, and an address (A[0.. 11]) and a control signal (CONTROL_D) for storing the data into the first and the second frame buffer in macro block units.

BRIEF DESCRIPTION OF THE DRAWINGS

The above and other objects, features, and advantages of the present invention will be apparent from the following detailed description of the preferred embodiments of the invention in conjunction with the accompanying drawings, in which.

DESCRIPTION OF THE PREFERRED EMBODIMENT

Reference will now be made in detail to the present invention, examples of which are illustrated in the accompanying drawings. Wherever possible, the same reference numbers will be used throughout the drawings to refer to the same or like parts.

Figure 2:
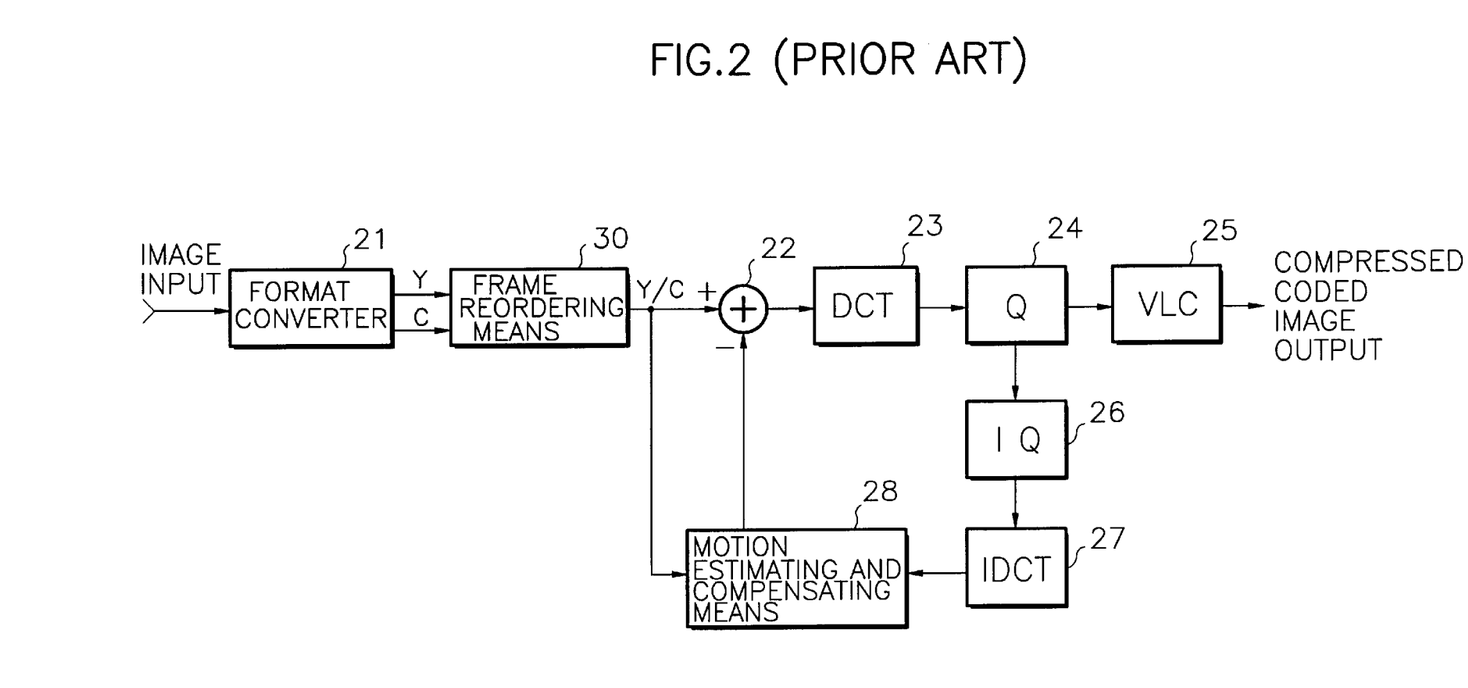
FIG. 2 is a view illustrating a conventional image coder applied to the present invention.

As illustrated in FIG. 2, an image coder of the present invention comprises a format converter 21 for transforming input image signals; a frame reordering means 30 for reordering a sequence of input image signals; a motion estimating and compensating means 28 for estimating and compensating motion of the reordered frame data; a subtracter 22, which outputs I-pictures directly and the difference between the current image and motion compensated image of P-pictures or B-pictures; a discrete cosine transformer 23; a quantizer 24; a variable length coder 25; an inverse quantizer 26; and an inverse discrete cosine transformer 27. In addition to the above, a main controller for entire coding processes (not shown) is included.

The image coder will not be further elaborated in detail herein since it is widely known through MPEG 2. In order to perform motion compensation, the order of I, B, B, P, B, B, P . . . pictures is transformed and outputted as I, P, B, B, P, B, B . . . pictures by the frame reordering means 30. The frame reordering means 30 is also required in the decoder in order to output the pictures from the decoder according to its input order.

Figure 3:
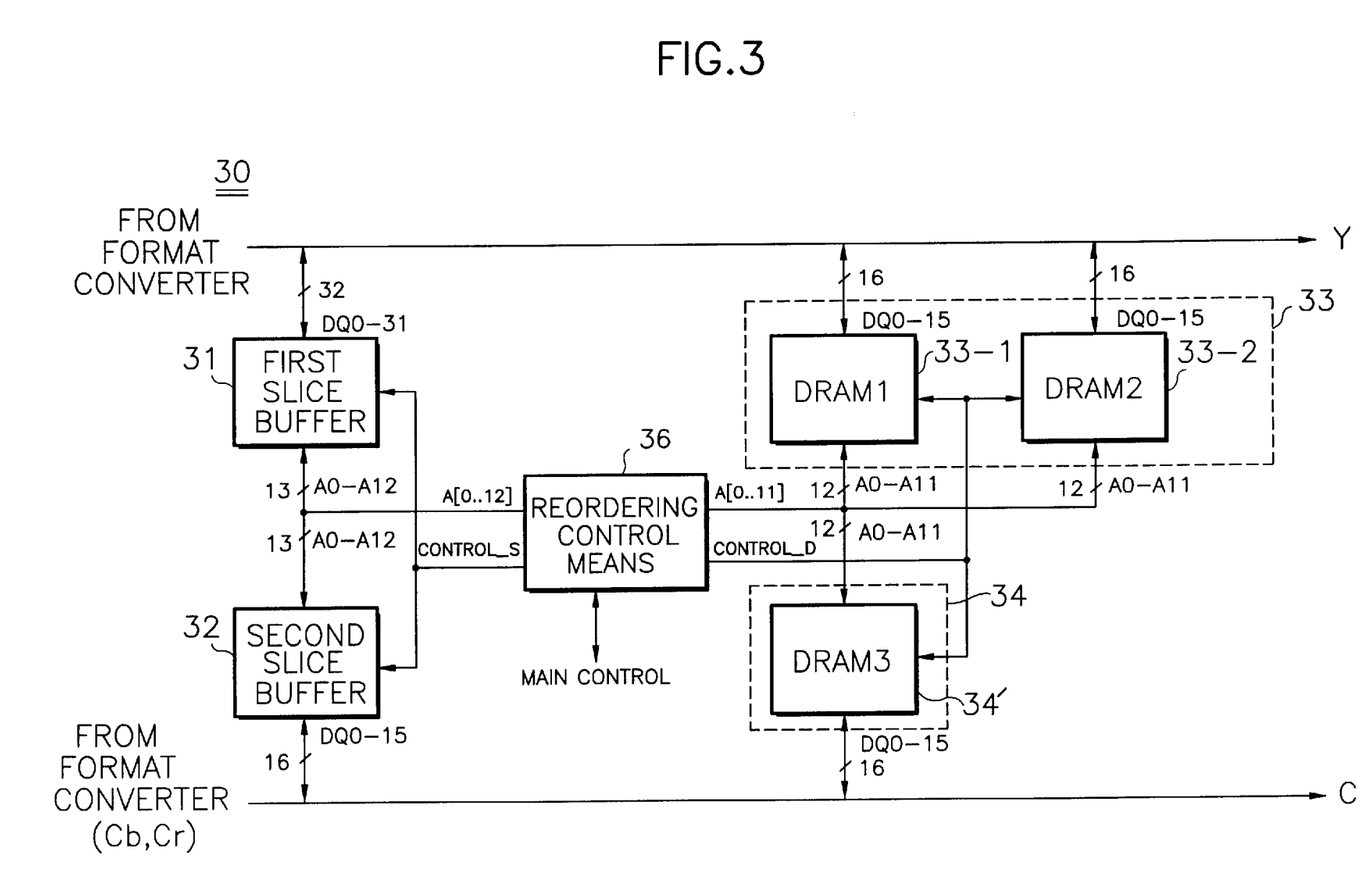
FIG. 3 is a block diagram illustrating an apparatus for reordering frames in accordance with a preferred embodiment of the present invention.

As illustrated in FIG. 3, an apparatus for reordering frames comprises a first slice buffer 31, a second slice buffer 32, a first frame buffer 33, a second frame buffer 34, and a reordering control means 36.

The first frame buffer 33 is embodied by two DRAMs 33-1, 33-2 and the second frame buffer 34 is embodied by a DRAM 34'. It is desirable that the DRAMs 33-1, 33-2, 34' are of high speed DRAMs (1M×16) of EDO type. The DRAMs are accessed by 12-bit add ress line (A0–A11) from the reordering control means 36. In ad dition, the DRAMs have 16-bit data width (DQ0–DQ15) and are read or written according to the instructions on the control signal line (CONTROL-D); for example, a control signal line (CONTROL-D) contains a write signal line (/W)and an output enabling signal line (/OE). Accordingly, an input data in a data-bus are stored in an appropriate address area in presence of an address line and write (/W) signal, and the stored data in the appropriate address are outputted through a data bus in presence of an output enabling signal (/OE).

In addition, the first slice buffer 31 and the first frame buffer 33, for processing input luminance signals (Y) from the format converter 21, are commonly connected to the 32-bit data-bus, and can input and output 4 pixels (4 pels) of 8 bits at once. The second slice buffer 32 and the second frame buffer 34, for processing chrominance signals (C) from the format converter 21, are commonly connected to the 16-bit data-bus, and can input and output 2 pixels (2 pels) of 8 bits at once.

In addition, the first slice buffer 31 and the second slice buffer 32 can read or write 13-bit address line (A0–A12) and control signal lines (CONTROL_S) from the reordering control means 36. The control signal lines (CONTROL_S) contain at least one write signal (/W) line and one read signal (/RD) line. Accordingly, the data in the appropriate address are outputted on the data-bus in presence of an address and a read signal (/RD). However, the data in the data-bus are stored in the area of an appropriate address in presence of a write signal (/W).

Here, the reordering control means 36 transmits and receives control information from the main controller. It also receives information for a current input frame, and generates an address and control signal in order to access slice buffer and frame buffer. In addition, the first slice buffer 31 stores output pixels from the format converter 21 in slice units and outputs the pixels to transform the line-scanned luminance signal (Y) data into a macro block units. The second slice buffer 32 stores output pixels from the format converter 21 in slice units and outputs the pixels to transform the line-scanned chrominance signals (C=CrCb) data into a macro block units.

Figure 4A:
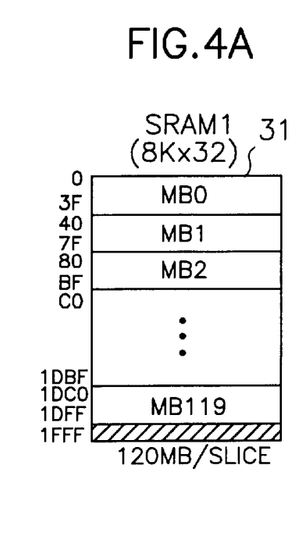
FIGS. 4A to 4D are views showing a DRAM map illustrated in FIG. 3 in accordance with a preferred embodiment of the present invention.

Accordingly, as illustrated in FIG. 4A, the first slice buffer 31 is embodied by SRAM of 8 K×32 bit for storing 120 macro blocks. In FIG. 4A, $MB_0$ is located between the addresses $0000_H$ and $003F_H$, and $MB_{119}$ is located between the addresses $1DC0_H$ and $1DFF_H$.

Figure 4B:
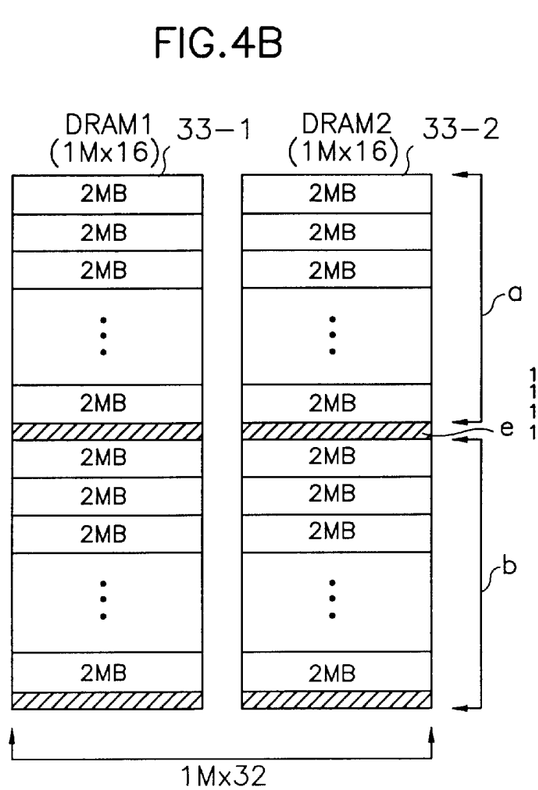
Figure 4C:
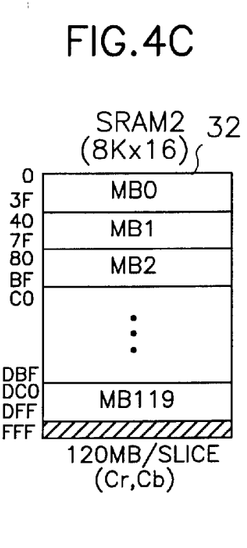

In addition, as illustrated in FIG. 4C, the second slice buffer 32 is embodied by SRAM of 8 K×16 bit for storing 120 macro blocks. In FIG. 4C, $MB_0(CrCb)$ is located between the addresses $0000_H$ and $003F_H$, and $MB_{119}(CrCb)$ is located between addresses $1DC0_H$ and $1DFF_H$.

In addition, the first frame buffer 33 requires a minimum memory capacity for storing the luminance signal (Y) data in 2 frames of B-pictures. The second frame buffer 34 requires a memory capacity for storing chrominance signal data in 2 frames of B-pictures.

According to the format of output images from the format converter 21, the chrominance signal (C) is conventionally smaller than the luminance signal (Y) (for example, in 4:2:0 format, the luminance signal and the chrominance signal are respectively 720×480 and 360×240). Hence, the size of data bus and memory capacity of frame buffer for the chrominance signal is only ½ of the luminance signal.

Figure 4D:
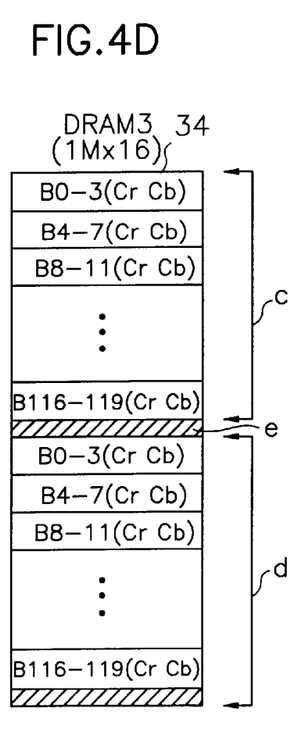

Accordingly, the first frame buffer 33, as illustrated in FIG. 4B, has a memory map composed of 2 DRAMs 33-1, 33-2, and the second frame buffer 34, as illustrated in FIG. 4D, has a memory map composed of only one DRAM.

Namely, in FIG. 4B, "2MB" indicates 2 macro blocks. The first DRAM 33-1 and the second DRAM 33-2 have a capacity to store 1M×16 bits. An area of the first frame buffer a consists of 68 slices/frames, 4 macro blocks/rows, and 2040 rows for storing $B_n$ picture. An area of the second frame buffer b consists of 68 slices/frames, 4 macro blocks/rows, and 2040 rows for storing $B_{n+1}$ picture. In addition, there is a blank area of 8 rows in the boundary of storage area of each frame.

FIG. 4D, $B_{0-3}(CrCb)$ indicates 4 blocks (block number 0-3) for storing the chrominance signals. The first frame area c consists of 68 slices/frames, 4 blocks/rows, and 2040 rows for storing $B_n$ pictures in between $B_{0-3}(CrCb)$ blocks and $B_{116-119}(CrCb)$ blocks. The second frame storage area c consists of 68 slices/frames, 4 blocks/rows, and 2040 rows for storing $B_{n+1}$ pictures in between $B_{0-3}(CrCb)$ blocks and $B_{116-119}(CrCb)$ blocks. In addition, there is a blank area of 8 rows in the boundary of storage area of each frame.

Figure 5:
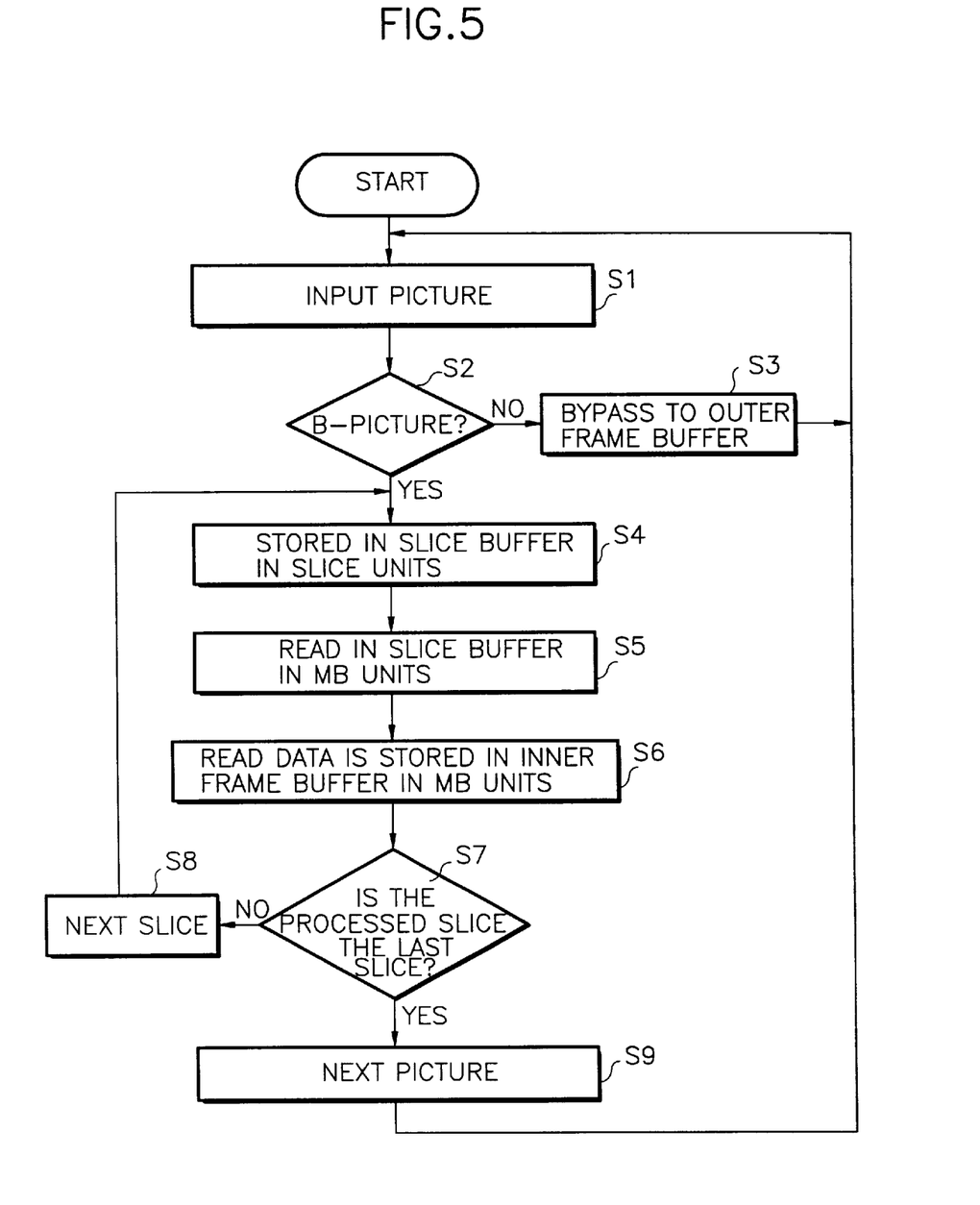
FIG. 5 is a flowchart illustrating a method for reordering frames in accordance with a preferred embodiment of the present invention.

Another embodiments of the apparatus of the present invention will be described in detail by referring to the flowchart in FIG. 5 and the time sequence in FIGS. 6A to 6E.

Firstly, the image frames are transformed to I-pictures or P-pictures or B-pictures by the format converter 21. As illustrated in FIG. 5, the line-scanned pixel data of the transformed frames are sequentially inputted to the reordering apparatus. (S1)

The line-scanned input data are by-passed to the outer frame buffers if the current frame is not B-picture, namely the current frame of I-pictures or P-pictures; however, the line-scanned input data are stored in the slice buffer in slice units if the current frame is a B-picture. At this time, the luminance data are stored in the first slice buffer 31 and the chrominance data are stored in the second slice buffer 32.

The data stored in the slice buffers 31, 32 are read according to address (A[0.. 12]) and control signal (CONTROL_S) from the reordering control means 36 to store the data read in the inner frame buffers 33, 34 in macro block units. The luminance data stored in the first slice buffer 31 are stored in the first frame buffer 33 in macro block units. In addition, the chrominance data stored in the second slice buffer 32 are stored in the second frame buffer 34 in block units.

Next slice is sequentially processed if the current processed slice is not the last slice.

At the completion of storing the last slice into the slice buffer 31, 32, the data are again read to be stored in the frame buffer in macro block units.

Next, as the current $B_n$ picture is fully stored, the next picture $B_{n+1}$ is stored by the above described procedure.

Like the above, the frame data of P-pictures are inputted after the $B_n$ picture and $B_{n+1}$ picture are fully stored. After outputting the frame data of P-pictures to the motion estimation means (not shown), the $B_n$ picture and the $B_{n+1}$ picture are sequentially outputted to the motion estimation means.

Figure 6A:
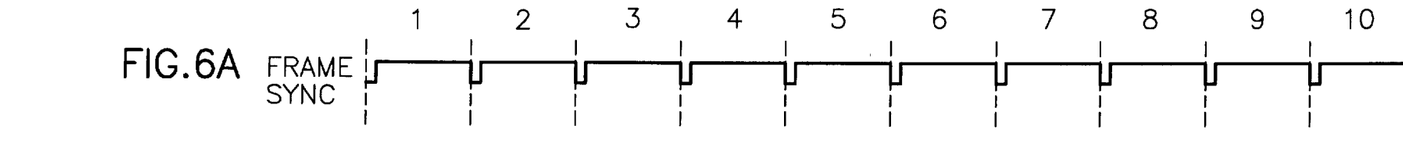
FIGS. 6A to 6E are views showing a time sequence of each portion illustrated in FIG. 3 in accordance with a preferred embodiment of the present invention.

As illustrated in FIG. 6A, each frame cycle is synchronized by a frame synchronizing signal.

Figure 6B:
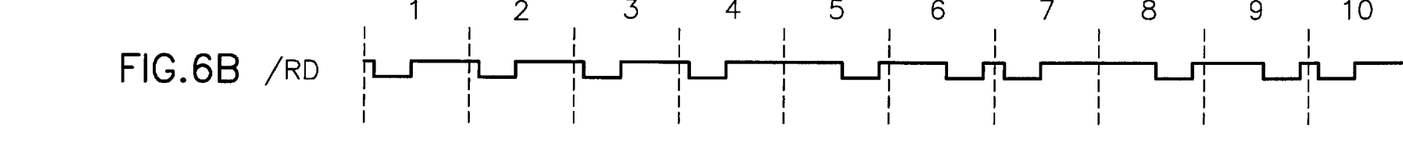

As illustrated in FIG. 6B, a read signal (/RD) reads the picture data from the slice buffers 31, 32 when the read signal (/RD) is 'row'. The read signal (/RD) sequentially reads the data when the image frames are inputted in the order of I, B, B, P, B, B, P, B, B . . . .

Figure 6C:
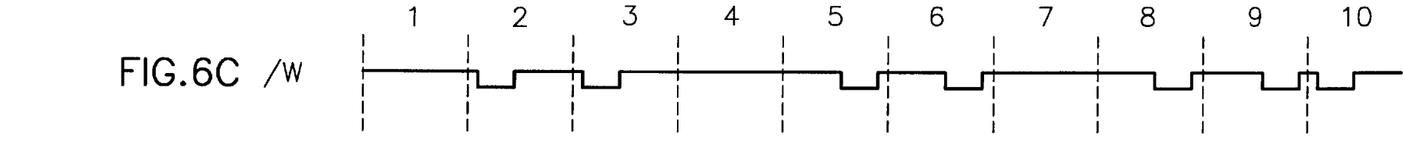

FIG. 6C illustrates a write signal (/W) for storing output data from the slice buffers 31, 32 to the DRAMs 33-1, 33-2, 34'. I-pictures and P-pictures are outputted to the motion estimation means in presence of a read signal (/RD) illustrated in FIG. 6B. The B-pictures are stored in the DRAMs 33-1, 33-2, 34' by the write signal (/W).

Figure 6D:
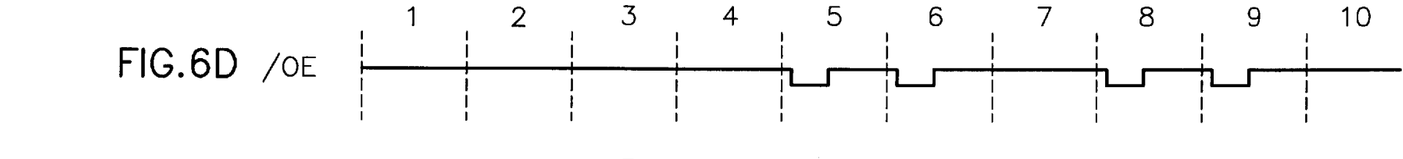
Figure 6E:
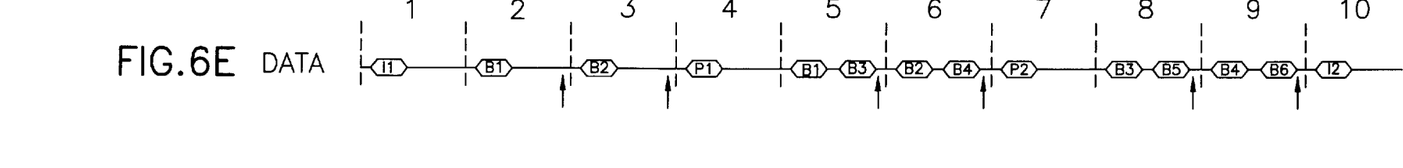

FIG. 6D shows an output enabling signal of the DRAMs 33-1, 33-2, 34', which outputs the data of B1-picture stored in the second frame cycle after P1-picture is outputted. FIG. 6E shows the time sequence for available data in the data bus.

As illustrated in FIGS. 6A to 6E, in frame cycle 1, the data I1 from the slice buffer 31, 32 (/RD signal) are not stored in the DRAMs 33-1, 33-2, 34' but are directly outputted to the motion estimation means. In frame cycle 2, the data B1 from the slice buffers 31, 32 (/RD signal) are stored in the DRAMs 33-1, 33-2, 34' by the write signal (/W).

In addition, in frame cycle 3, the data of B2-picture from the slice buffers 31, 32 are stored in the DRAMs 33-1, 33-2, 34' by the read signal (/RD), and in frame cycle 4, the data of P-pictures from the slice buffers 31, 32 (/RD signal) are not stored in the DRAMs 33-1, 33-2, 34' but are directly outputted to the motion estimation means. At this time, as the DRAMs 33-1, 33-2, 34' store B-pictures in 2 frames, they alternately read and write in the frame storage area illustrated in FIGS. 4B and 4D.

In frame cycle 5, as the DRAMs 33-1, 33-2, 34' are occupied by 2 frames of B-pictures, the output enabling signal (/OE) is present and the data of B1 picture are outputted to the motion estimation means. The data of B3-picture, which are read from the slice buffers 31, 32 by the read signal (/RD) are stored in the DRAMs 33-1, 33-2, 34' by the write signal (/W). The operation described above can be accomplished by a high-speed memory since it is repeated within the same frame cycle.

The B1-picture data, which are stored in the DRAMs 33-1, 33-2, 34' in the frame cycle 2 are delayed as much as 2 frames, when compared to P1 picture ouputted to the motion estimation means. Therefore, the input frames and the output frames are in different order. In frame cycle 6, the previous stored data of B2-picture are outputted to the motion estimation means in presence of an output enabling signal (/OE), and the data of B4-picture, which are read from the slice buffers 31,32 by the /RD signal, are stored in the DRAMs.

In frame cycle 7, the data of P2-picture, which are read from the slice buffers 31, 32 by the read signal (/RD) are not stored in the DRAMs 33-1, 33-2, 34' but are directly outputted to the motion estimation means. In frame cycle 8 and 9, the same operation for the frame cycle 5 and 6 is repeated, so the B-pictures (B3, B4) are delayed as much as 2 frame when outputted. In frame cycle 10, the data of I2-picture, which are read from the slice buffers 31,32 by the read signal (/RD) are not stored in the DRAMs 33-1, 33-2, 34' but are directly outputted to the motion estimation means.

As described above, a relationship between the input frame and the output frame according to the present invention is described in the following table 1.

TABLE 1

| frame reordering timing in case of M = 3 | | | | | | | | | | | | | | | |
|---|---|---|---|---|---|---|---|---|---|---|---|---|---|---|---|
| INPUT IMAGE | I1 | B1 | B2 | P1 | B3 | B4 | P2 | B5 | B6 | I2 | B7 | B8 | P3 | B9 | B10 | ... |
| DRAM INPUT | | B1 | B2 | | B3 | B4 | | B5 | B6 | | B7 | B8 | | B9 | B10 | ... |
| OUTPUT | | | | | B1 | B2 | | B3 | B4 | | B5 | B6 | | B7 | B8 | ... |
| OUTPUT IMAGE | I1 | | | P1 | B1 | B2 | P2 | B3 | B4 | I2 | B5 | B6 | P3 | B7 | B8 | ... |

Like the above table 1, the data of image frames, which are inputted in the order of I1, B1, B2, P1, B3, B4, P2, B5, B6. . . , are outputted in the order of I1, P1, B1, B2, P2, B3, B4, I2. . . , after the data are delayed in the frame buffers, when the frames are reordered.

In the embodiments of the present invention, a refresh cycle is about 64 ms when using DRAMs, which has the frame buffer access time of 50 ns. In the time sequence diagram of FIGS. 6A to 6B, an arrow indicates a refresh point.

In the prior art, when M=3, frames are reordered by using DRAMs of 4 frames. However, in the present invention, the frames can be reordered by utilizing DRAMs of 2 frames. Accordingly, the present invention has an advantage in that the amount of memory required and the delayed time are decreased.

While this invention has been described in connection with what is presently considered to be the most practical and preferred embodiments, it is to be understood that the invention is not to limited to the disclosed embodiment, but, on the contrary, it is intended to cover various modifications and equivalent arrangements included within the spirit and scope of the appended claims.

What is claimed is:

1. A method for reordering frames in MPEG coder/decoder, in which input image frames of displaying order are transformed to a transmitting order, and received image frame of transmitted order are transmitted to a displaying order, for coding and decoding by dividing image frame data into I-pictures, P-pictures, and B-pictures, said method comprising the steps of:

a) determining whether current input image frames are B-pictures or not, and by-passing to an outer frame buffer if determined not to be B-pictures;

b) inputting line-scanned pixel data if determined to be B-pictures and storing the line-scanned data in a slice buffer in slice units;

c) reading the stored data from the slice buffer and storing the read data to an inner frame buffer in macro block (MB) units;

d) determining whether the processed slice is the last slice or not and repeating the steps b) and c), if not; and e) repeating the above entire steps for the next picture if the processed picture is not the last frame.

2. The method of claim 1, wherein luminance data of the line-scanned pixel data are stored in a first slice buffer and chrominance data of the line-scanned pixel data are stored in a second slice buffer.

3. The method of claim 2, wherein the data stored in the first slice buffer are stored in the first frame buffer in macro block units and the data stored in the second slice buffer are stored in the second frame buffer in macro block units.

4. An apparatus for reordering frames in MPEG coder/decoder, in which input image frames of displaying order are transformed to transmitting order, and received image frames of transmitted order are transformed to displaying order, for coding and decoding by dividing image frame data into I-pictures, P-pictures, and B-pictures, said apparatus comprising:

a) a first slice buffer for storing luminance (Y) data of input image frames in slice units, if the input image is determine to be B-picture transforming and outputting the data in macro block units;

b) a second slice buffer for storing chrominance (C) data of input image frames in slice units, if the input image is determine to be B-picture transforming and outputting the data in macro block units;

c) a first frame buffer for storing luminance (Y) output data from the first slice buffer in as much as 2 frames if the input image is determined to be B-picture;

d) a second frame buffer for storing chrominance (C) output data from the first slice buffer in as much as 2 frames if the input image is determined to be a B-picture; and e) a reordering means for generating an address (A[0..12]) and a control signal (CONTROL_S) for reading and writing the line-scanned data into and from the first and second slice buffer, and an address (A[0..11]) and a control signal (CONTROL_D) for storing the data into the first and second frame buffer in macro block units.

5. The apparatus of claim 4, wherein the first frame buffer and second frame buffer are embodied by EDO-type DRAMs.

* * * * *